US010355468B2

United States Patent
Alger, Jr.

(10) Patent No.: US 10,355,468 B2
(45) Date of Patent: Jul. 16, 2019

(54) CABLE MANAGEMENT SPIRAL

(71) Applicant: TIM PRICE, INC., Winchester, VA (US)

(72) Inventor: Fred H. Alger, Jr., Winchester, VA (US)

(73) Assignee: TIM PRICE, INC., Winchester, VA (US)

( * ) Notice: Subject to any disclaimer, the term of this patent is extended or adjusted under 35 U.S.C. 154(b) by 0 days.

(21) Appl. No.: 15/752,732

(22) PCT Filed: Aug. 12, 2016

(86) PCT No.: PCT/US2016/046767
§ 371 (c)(1),
(2) Date: Feb. 14, 2018

(87) PCT Pub. No.: WO2017/030957
PCT Pub. Date: Feb. 23, 2017

(65) Prior Publication Data
US 2018/0241189 A1    Aug. 23, 2018

Related U.S. Application Data

(60) Provisional application No. 62/205,467, filed on Aug. 14, 2015.

(51) Int. Cl.
| H02G 11/00 | (2006.01) |
| B65H 75/36 | (2006.01) |
| H02G 1/12 | (2006.01) |
| H01B 7/18 | (2006.01) |
| H01B 9/00 | (2006.01) |

(52) U.S. Cl.
CPC .......... *H02G 11/006* (2013.01); *B65H 75/36* (2013.01); *H02G 1/1202* (2013.01); *B65H 2701/34* (2013.01); *B65H 2701/391* (2013.01); *H01B 7/1865* (2013.01); *H01B 9/003* (2013.01)

(58) Field of Classification Search
CPC .............. H02G 11/006; H02G 1/1202; B65H 2701/391; B65H 2701/34
USPC ........................................................ 174/135
See application file for complete search history.

(56) References Cited

U.S. PATENT DOCUMENTS

| 2,456,330 A | * 12/1948 | Scott | ........................ H01Q 1/10 |
| | | | 343/901 |
| 4,497,760 A | 2/1985 | Sorlien | |

(Continued)

FOREIGN PATENT DOCUMENTS

DE         4317636 C1    9/1994

OTHER PUBLICATIONS

International Search Report and Written Opinion dated Oct. 31, 2016 in International Application PCT/US2016/046767 filed Aug. 12, 2016.

*Primary Examiner* — Sherman Ng
(74) *Attorney, Agent, or Firm* — Nixon & Vanderhye, P.C.

(57) ABSTRACT

A cable management assembly may include a cable management spiral and a cable bundle in operative engagement to the cable management spiral. The cable management spiral may be a spring coil, such as a stainless steel spring coil. Heat shrink wrap and/or sheathing may be used to operatively engage the cable bundle to the cable management spiral. The cable management assembly may be installed on a telescoping mast assembly.

18 Claims, 6 Drawing Sheets

(56) References Cited

U.S. PATENT DOCUMENTS

| | | | | |
|---|---|---|---|---|
| 4,920,354 | A * | 4/1990 | Rauser | H01Q 1/10 343/901 |
| 5,168,679 | A * | 12/1992 | Featherstone | B66F 3/06 52/108 |
| 5,271,975 | A * | 12/1993 | Solano | B29C 53/083 174/74 A |
| 5,743,635 | A * | 4/1998 | Hulse | B60Q 1/2657 362/294 |
| 6,158,555 | A * | 12/2000 | Brown, Jr. | H02G 11/003 138/120 |
| 6,290,377 | B1 | 9/2001 | Hulse | |
| 6,479,752 | B1 * | 11/2002 | Neuroth | E21B 17/1028 174/106 R |
| 6,767,115 | B2 | 7/2004 | Blackwelder | |
| 2003/0095411 | A1 * | 5/2003 | Blackwelder | B60P 3/18 362/385 |
| 2003/0230836 | A1 * | 12/2003 | Speckhart | F16F 1/13 267/286 |
| 2006/0207493 | A1 * | 9/2006 | Chasmar | G09F 17/00 116/173 |
| 2009/0050346 | A1 * | 2/2009 | Steward, Jr. | H01B 7/226 174/107 |
| 2010/0005734 | A1 * | 1/2010 | McClure | E04H 12/182 52/111 |
| 2010/0050557 | A1 * | 3/2010 | Falck-Schmidt | F16B 7/14 52/632 |
| 2014/0150834 | A1 * | 6/2014 | Nootenboom | A45B 9/00 135/75 |
| 2014/0263828 | A1 | 9/2014 | Blanchard et al. | |
| 2014/0338950 | A1 * | 11/2014 | Lutnesky | B65H 75/36 174/69 |

* cited by examiner

CABLE MANAGEMENT SPIRAL

CROSS REFERENCE TO RELATED APPLICATIONS

This application claims the benefit of U.S. Provisional Application 62/205,467, filed Aug. 14, 2015, the entire contents of which are incorporated by reference.

STATEMENT REGARDING GOVERNMENT SUPPORT

None

FIELD

The present disclosure relates to an improved cable management assembly for telescopic masts whereby the common practice of routing cables through a coiled plastic conduit is replaced by attaching the cables to a metallic cable management spiral.

BACKGROUND

Masts and towers are widely used to overcome the short ground level line of sight range of devices which exploit the electromagnetic spectrum, including radio systems, electro-optical systems, TV transmitter and receiver antennas, and many more. The restriction on range occurs due to the effect of the curvature of the earth, and, in many cases, due to local obstructions. Usually, cables are necessary to run the electromagnetic and/or optical signals from the device at the top of the mast to ground level.

In addition to static masts at fixed locations, such as cell towers, there exist many needs for transportable, quick set up masts and towers for temporary, emergency, or military use. Some of these—mostly vehicle-mounted masts of telescopic design—are intended for "push-button" operation, where the operator's only task is to press a button to raise or lower the mast.

To provide a mobile push-button system which requires no additional intervention by the user, an automatic cable management system is necessary. De facto, the cable(s) must remain connected at upper and lower ends. This requirement usually rules out the use of cable reels (which would necessitate disconnection of the lower end of the cables as the mast extends and retracts). An effective cable management method is to form the cable into a helical coil wound around the mast. If the coil is sufficiently long, both lower and upper ends may remain connected at all times, and the mast may be extended to full height with the helix simply increasing in length while reducing in diameter in compensation.

For decades, since the early days of Outside Broadcast and Electronic News Gathering, it has been common industry practice to use coiled air hose as a housing conduit for the cable systems used in conjunction with pneumatic telescopic masts installed on mobile communications vans. Typical air hose is made from polyurethane, polyethylene, or nylon, as is known in the art. Air hose is used in a wide range of industrial applications for the transfer of air, water, or moderate chemical solutions. Coiled air hose is intended for use for the same industrial applications, but, because it resists kinking, and occupies minimum space when coiled up, it has been used for other applications when those two features are of value. These early cable management methods were used with military mobile communications and intelligence systems around the same time. The principle reason for the adoption of this technique is that the air hose, which operates much like a spring, has a memory, exhibiting a preference for the helical shape. As a result, the assembly assists in keeping the cables where they need to be in relation to the mast, whether in the retracted state, during extension/retraction, or when fully extended.

A problem with industrial air hose is that it is not intended to be used as a conduit for cables, and, in some cases, the manufacturer is unwilling to support the use of its product for this application. Thus, there is no warranty, and often, no detailed technical information regarding the mechanical performance under extreme environmental conditions.

Second, the largest industrial air hose available has an internal diameter of only 1¼ inches. This diameter severely limits the number and size of cables that can be housed in the conduit. Air hose manufacturers have expressed little interest, if any, in manufacturing larger hoses for housing conduit use. Mast system designs are thus limited in terms of cabling.

Third, the coiled air hose minimizes the space occupied when not in use, and therefore comes in a tight coil that exhibits spring-like behavior. A certain amount of force is required to extend the coiled air house. This spring force directly opposes the motive force of the mast extension mechanism. Put another way, the effect of the spring force is to increase the payload weight of the mast. One result is that the telescoping mechanism must be designed with sufficient strength to extend the mast at significantly larger loads than those imposed solely by the payload, thereby increasing the overall size and cost of the assembly.

Another drawback is that installation of cables within an air hose is a difficult and time-consuming procedure, provided by a limited number of specialist practitioners. At least one air hose manufacturer claims the installation procedure weakens the air hose.

A further drawback is that, once installed, individual cables are not easily replaced in the event of a continuity problem. In many cases, it is more cost effective (but none-the-less expensive) to replace the entire assembly, including air hose.

The most dramatic disadvantages of using an industrial air hose for cable management arise in outdoor applications at low temperatures. The mechanical properties of most air hoses vary significantly with temperature. In temperate climate zones, this temperature dependency becomes apparent in wintertime. For example, nylon and polyurethane air tubes exhibit a significant increase in spring force as temperature decreases. This phenomenon increases the effective weight of the mast payload. In some cases, such as at the low end temperatures commonly specified for military applications (e.g., about −40° C./F.), the spring loads imposed by the cable assembly conduit alone may be in the hundreds of pounds. Because of the temperature-dependent properties of air hoses, the effective payload weight can increase at low temperatures, sometimes to the point where the capabilities of the mast and/or its drive mechanism are exceeded.

Another adverse effect of increasing spring force with reduced temperature is the twist force imposed by the helical air hose as the mast extends. This twist force is a function of the spring force consequent upon the extension of any coil whose ends are secured, so large forces are highly undesirable. In the case of a telescoping mast, the lowest tube section is secured by the mast mounting arrangements, so any twist forces tend to twist the top of the mast (which is cantilevered). This twisting tends to create difficulties where accurate payload pointing angles are required (such as narrow beam antennas, or narrow field of view optical systems). In extreme conditions, such twisting forces may result in mechanical/structural problems.

Typical air hoses used as cable conduits become increasingly rigid as temperatures decreases. If exposed to cold sink conditions, they tend to exhibit great reluctance to retract neatly, and may require manual intervention to properly stow as the mast column retracts. Such manual intervention will often require a crew member to climb up on the vehicle, sometimes to a precarious position. This clearly is a major drawback in a system designed for pushbutton operation.

In addition, at cold temperatures, the air hose tends to become brittle. There are many reports from the Electronic News Gathering community regarding embrittlement and consequential fracturing of the hose during or after exposure to cold weather, usually at the upper and lower extremities of the assembly. Conduit fracturing tends to happen at these locations because, as the working length of the coil is shortened or lengthened as the mast moves up and down, the conduit flexes as it exits rigid attachment brackets, inducing fatigue at those points.

What is needed is an alternative to housing conduit in telescoping masts that overcomes the many shortfalls of the common air hose used in conventional systems. In particular, a cable management assembly with a cable assembly restraint device is needed that maintains the assembly in the desired shape, such as a helical coil in telescoping mast applications, that is designed for such applications, reducing the cost, size, and load of the overall assembly, and meets performance requirements throughout the range of potential temperature conditions.

BRIEF SUMMARY

Described herein are embodiments of a coil spring for managing one or more cables (e.g., a "cable bundle") in a cable management system, typically used with telescopic masts. Embodiments of the coil spring may provide mechanical support for the cable bundle. For example, the cable bundle may be secured to the coil spring, such as by a woven sheath, and the cable bundle and coil spring assembly may be maintained in a compact helical shape as a cable management spiral. The cable management spiral assembly may be positioned around a central mast column throughout all phases of mast operation (e.g., fully retracted, extending, fully extended, and retracting). Embodiments of the cable management assembly may permit the cables to remain in place while the mast is extended and retracted.

DESCRIPTION

The following description is of the best currently contemplated mode of carrying out exemplary embodiments of the invention. The description is not to be taken in a limiting sense, and is made merely for the purpose of illustrating the general principles of the invention.

A cable management spiral may be incorporated in a cable assembly for an expanding and retracting structure. Embodiments of a cable management spiral described herein act as a spring for managing a cable management assembly on a telescoping mast. A cable management spiral may maintain the cable management assembly's general shape as desired, e.g., as a helical coil. It should be appreciated that other embodiments of the cable management spiral may be used for managing cable assemblies on other expanding and contracting structures that generally call for connecting the opposing ends by cables. As described herein, embodiments of the cable management spiral overcome the many deficiencies of the contemporary coiled air hose systems, and provide the same—if not enhanced—benefits of air hose systems.

Figure 1A:
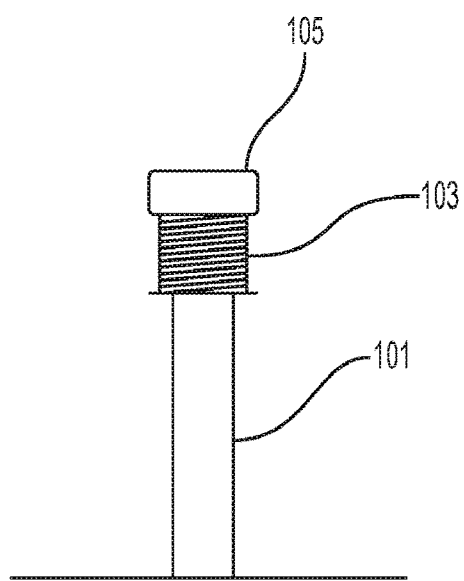
FIG. 1 shows a telescoping mast with a cable management assembly (A) in a retracted state and (B) in an extended state.
Figure 1B:
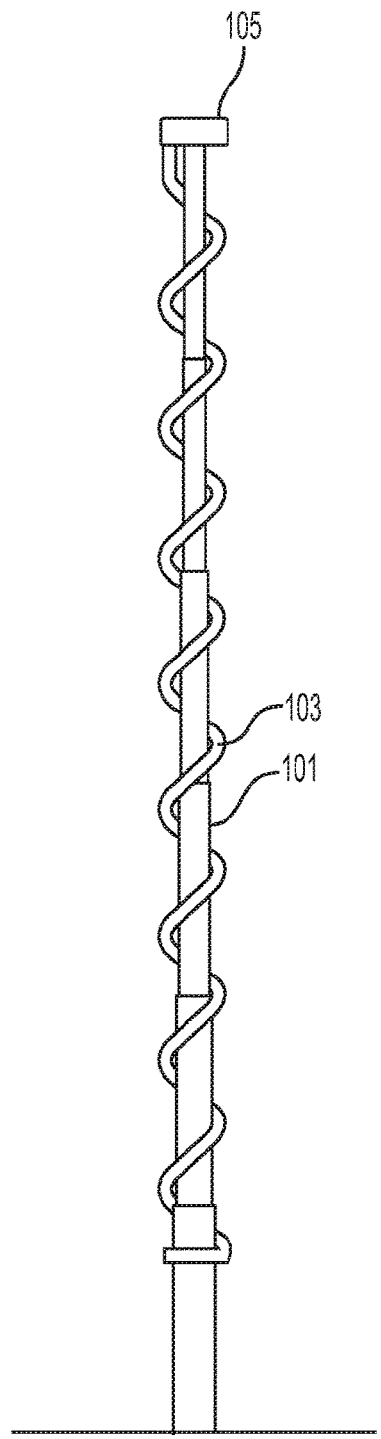

FIG. 1 shows a telescoping mast 101 with a cable management spiral 103 and a mast payload 105 in (A) a retracted configuration, and (B) an extended configuration. As can be seen in FIG. 1(A), mast 101 is retracted, and cable management spiral 103 is in a stowed configuration near an upper end of mast 101. It should be appreciated that the cable management spiral 103 may be stowed in a different location in other embodiments. FIG. 1(B) shows mast 101 fully extended, such that payload 105 is in a deployed position. Cable management spiral 103 is in an extended configuration in FIG. 1(B). When mast 101 is returned to the retracted position as shown in FIG. 1(A), spring forces keep cable management spiral 105 wrapped around mast 101 at an adequate tension to achieve the stowed position.

In some embodiments of the cable management spiral, the material and design of the spiral may be such that it exhibits a low mechanical force to extend or compress across a wide temperature range. At rest, when a spiral is placed with its long axis horizontal, the coils may be widely spaced, so that the forces to extend or compress the helical spring from that condition are approximately the same.

Generally, when horizontal, the length of the cable management spiral in its "at rest" condition, may be determined based on its weight, the weight of the cables and other components in the cable bundle, and in view of whether the spring force is to be used to counter-balance assembly weight during mast extension.

The diameter of the coil may be chosen to provide adequate clearance between the coil and the mast tube sections throughout the extension and retraction of the mast. It should be appreciated that one of skill in the art should be able to determine an appropriate coil diameter for a particular mast.

The number of the coils may be designed to provide an uncoiled length that is about twice the difference between the mast's extended height and its retracted height.

In some embodiments, the cable management spiral may comprise stainless spring steel. Typical stainless steel resists corrosion, provides the right spring characteristics, and exhibits an insignificant change in spring force across the entire temperature range typically specified for military applications.

Some embodiments of the cable management spiral may be manufactured from a thin stainless steel strip having a generally rectangular cross-section. Use of a cable management spiral fabricated from a stainless steel strip having a rectangular cross-section may provide a beneficial helical coil effect, and also eliminates restrictions on size and number of supported cables imposed by the current art. For any given set of cables, an appropriately sized cable management assembly including a cable management spiral also provides a less bulky arrangement, compared to contemporary assemblies incorporating an external air hose. Although embodiments described herein reference rectangular cross-sections, it should be apparent to those of skill in the art that other cross-sectional shapes may be used. For example, an ovular cross-section may be used, and may provide a reduction in weight. As another example, the cross-section may include one or more concave regions to accommodate all or a portion of the cable bundle.

Some embodiments may include one or more coatings on the cable management spiral. For example, a polymer or rubber coating may be applied to the cable management spiral. In embodiments that have performance requirements, such as operation at lower temperatures, the coating should meet such requirements. A black oxide process may be used, such as Heatbath Corporation PX-5-L liquid black oxide, which has a balance of alkali and oxidizers, and meets requirements of MIL-DTL-13924D for Class 4 black oxide coatings while providing abrasion resistance. Also, a black rubber industrial coating may be used.

Properly designed cable management systems, employing a cable management spiral as described herein, may function as intended across a very wide temperature range. As temperatures lower, there is no tendency to impart rapidly escalating spring forces, nor is there a plastic outer casing which easily shatters at upper and lower attachment points due to embrittlement.

Figure 2A:
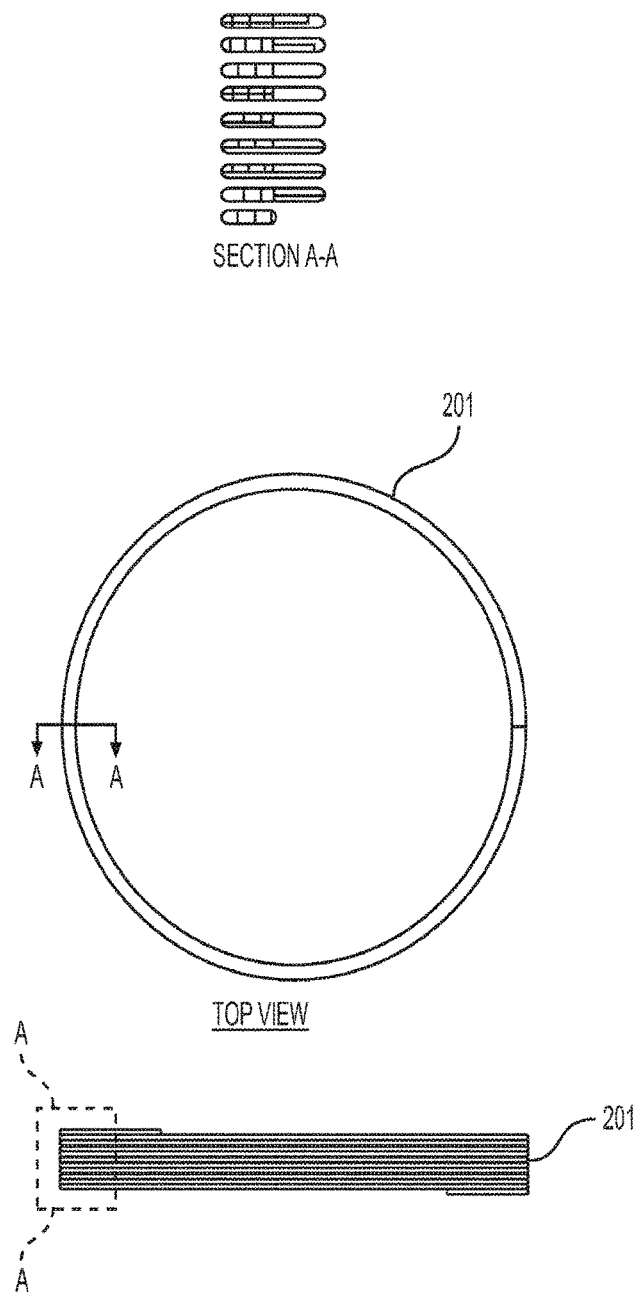
FIGS. 2(A) and 2(B) show various views of an embodiment of the cable management spiral.
Figure 2B:
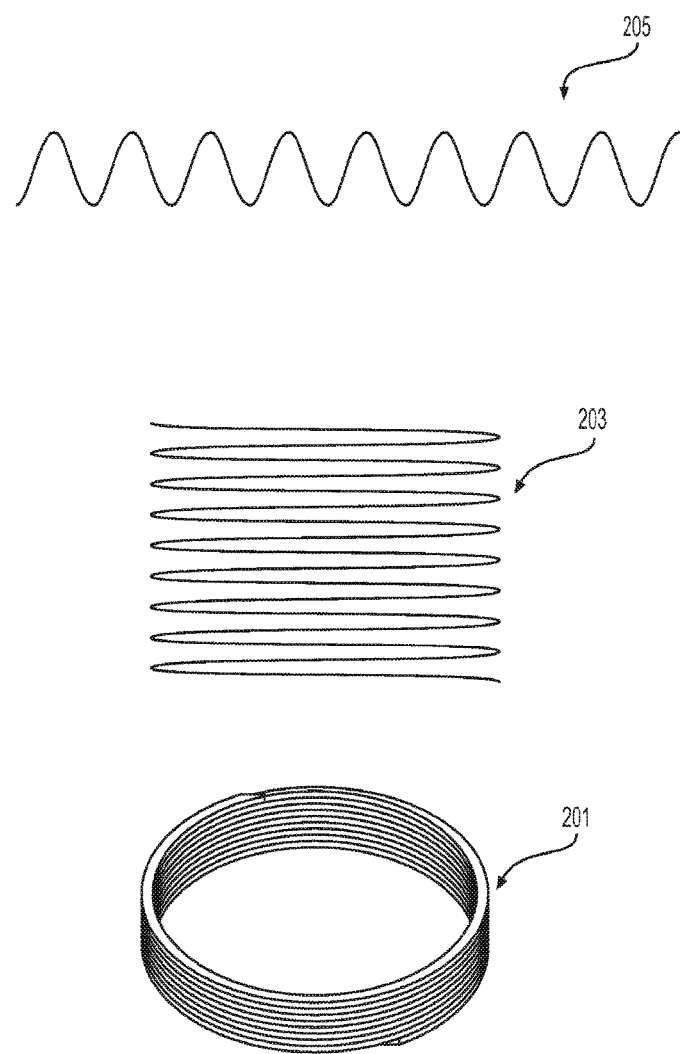

FIGS. 2(A) and 2(B) show various views of an embodiment of the cable management spiral 201. The side view and top view shown in FIG. 2(A) show a cable management spiral fully compressed, such as packed for shipment. Because the coils are formed from material having a rectangular cross-section, the packed height is significantly less than contemporary air hoses, resulting in significantly lower packaging and shipping costs. The cross-section view taken along A-A shows a section of the embodiment in a compressed configuration. As can be seen, in this embodiment the spiral is formed from a long, thin, rectangular strip of material. The FIG. 2(B) shows an isometric view of the embodiment cable management spiral. Embodiments of the cable management spiral 201 may retain the helical shape when included in a telescoping mast assembly. For example, cable management assembly 203, shown from a side view, is in a nested configuration, such as when the mast is retracted. In this view, a cable bundle, which may include one or more cables and other elements (not shown for clarity), may be positioned such that the bundle occupies the gap between each coil. However, it should be apparent to one of ordinary skill in the art that the cable bundle may be positioned in various ways about the cable management spiral. For example, in some embodiments, a cable bundle may be positioned above and below each coil. In some embodiments, all or a portion of a cable bundle may be positioned on a radially inner surface of the coil, and in some embodiments, all or a portion of a cable bundle may be positioned on a radially outer surface of the coil. FIG. 2(*b*) also shows a cable management system 205 at rest with its long axis horizontal, showing large gap between spirals when no contraction or expansion forces are applied to the ends. One of skill in the art should appreciate that the free length of the spiral, and other dimensions, are application dependent.

It will be seen from FIG. 2(B) that, in a state of rest, and prior to integration with a cable bundle, the cable management spiral 205 may be quite lengthy compared to its diameter. Such length-to-diameter ratios may provide the advantageous benefit of requiring an equal amount of force to compress or extend the cable management spiral. FIG. 2(A) shows a top view of an embodiment of the cable management spiral 201. Generally, the diameter of the coil is dependent on the application. In some embodiments applied to telescoping masts, the diameter should be large enough to provide clearance from the mast body, whether in the extended or retracted state. In some embodiments, it can be useful for the diameter to be such that, were the spiral to be unwound, its straight length would be proportional to approximately two times the difference between extended and retracted mast height.

A cable management spiral may comprise a thin material, such as stainless steel as described above. The thickness of the thin material may be selected that provides a robust cable management spiral intended for repeated and extended use in adverse outdoor conditions, and designed to meet military specification requirements for tactical military equipment. In some embodiments, the cable management spiral must be capable of reliably withstanding repeated cycles of extension and retraction, over many years of service, even under severe environmental conditions. The material thickness may also be selected such that spring forces approximately balance out the weight of the cable management assembly during the latter part of mast extension, such as, for example, when the mast is about 67% extended. This minimizes the motive force used to extend the mast.

Figure 3A:
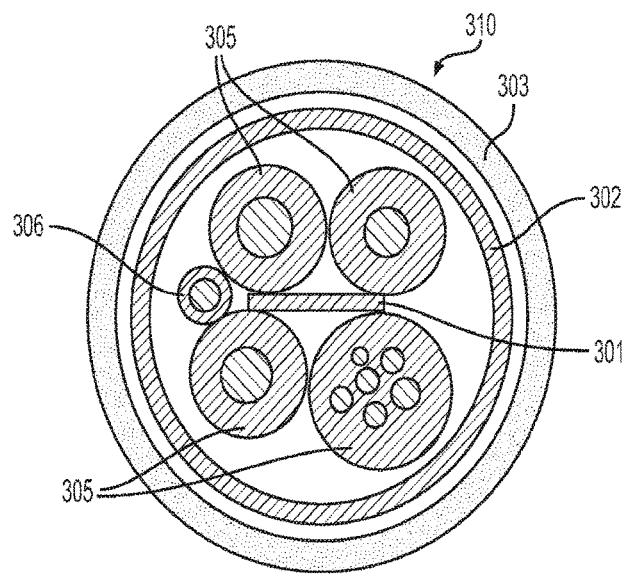
FIGS. 3(A) and 3(B) show cross sections of two embodiments of a cable management spiral.
Figure 3B:
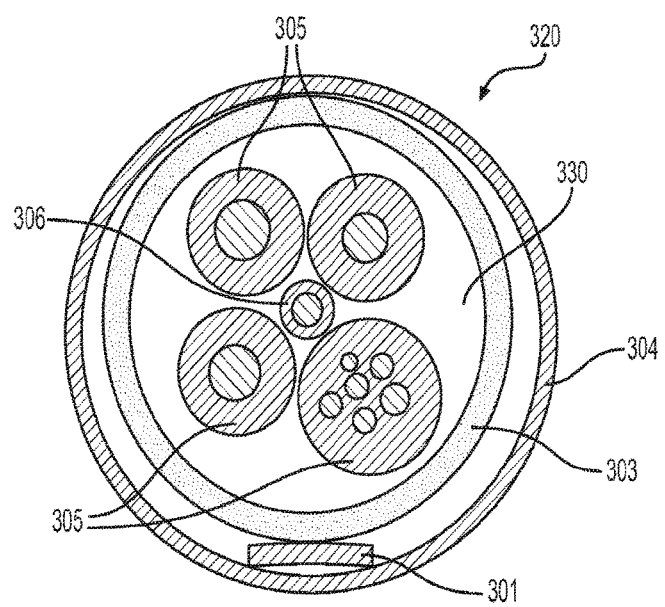

FIGS. 3(A) and 3(B) show cross sections of two embodiments of a cable management spiral. In FIG. 3(A), the embodiment includes cable management spiral 301 positioned at or near the center of the cable management assembly 310. The cable management assembly 310 also includes one or more power and/or communications cables 305 and ground cable 306, positioned around the cable management spiral 301. Some embodiments may include a heat shrink tubing 302 to assist with holding one or more cables 305 in position against cable management spiral 301. Heat shrink tubing 302 may span the entire length of the assembly 310 in some embodiments, and may be provided in shorter lengths at intervals in some embodiments. The configuration of the heat shrink tubing (e.g., length, spacing, etc.) may depend on the particular application. Some embodiments may include an exterior sheath 303, which may be, for example, a woven sheath. The exterior sheath 303 provides mechanical protection for the cables 305 and 306 and other components of the cable management assembly 310.

An example of heat shrink tubing is Viton medium duty neoprene heat shrink tubing, which is well suited for some embodiments. Available from a wide range of suppliers, and in many sizes, Viton has good flexibility in combination with excellent abrasion, corrosion, and environmental resistance. It is specifically intended for fabrication and repair of flexible harnesses and wire bundles, and retains its flexibility and other mechanical properties over the required temperature range.

An example of a suitable sheath is Techflex Flexo Clean Cut braided cable, comprised of polyethylene terephthalate filaments woven into a robust expandable braided sleeve. Designed to jacket and protect wire and cable assemblies in extreme environments, Flexo Clean Cut is easily pulled over the cable bundle by hand, and is well suited to provide the outer protective covering of cable management assemblies that include a cable management spiral.

The relative configuration of the components in a cable management assembly may vary from the embodiment shown in FIG. 3(A). For example, FIG. 3(B) shows another embodiment of a cable management assembly 320 in which the cable management spiral 301 is located on the outside of the cable bundle 330. This embodiment may reduce manufacturing and repair costs, because the cable bundle assembly may be separate from the cable management assembly 320 and easily attached thereto. In this embodiment, cables 305 and 306 are including in cable bundle 330, surrounded by sheath 303, and cable management spiral 301 is positioned between sheath 303 and heat shrink tubing 304. Although the embodiments are shown with interstitial space, the components of the cable management assemblies may be tightly wrapped to maintain a desired configuration during movement of the telescoping mast.

Figure 4:
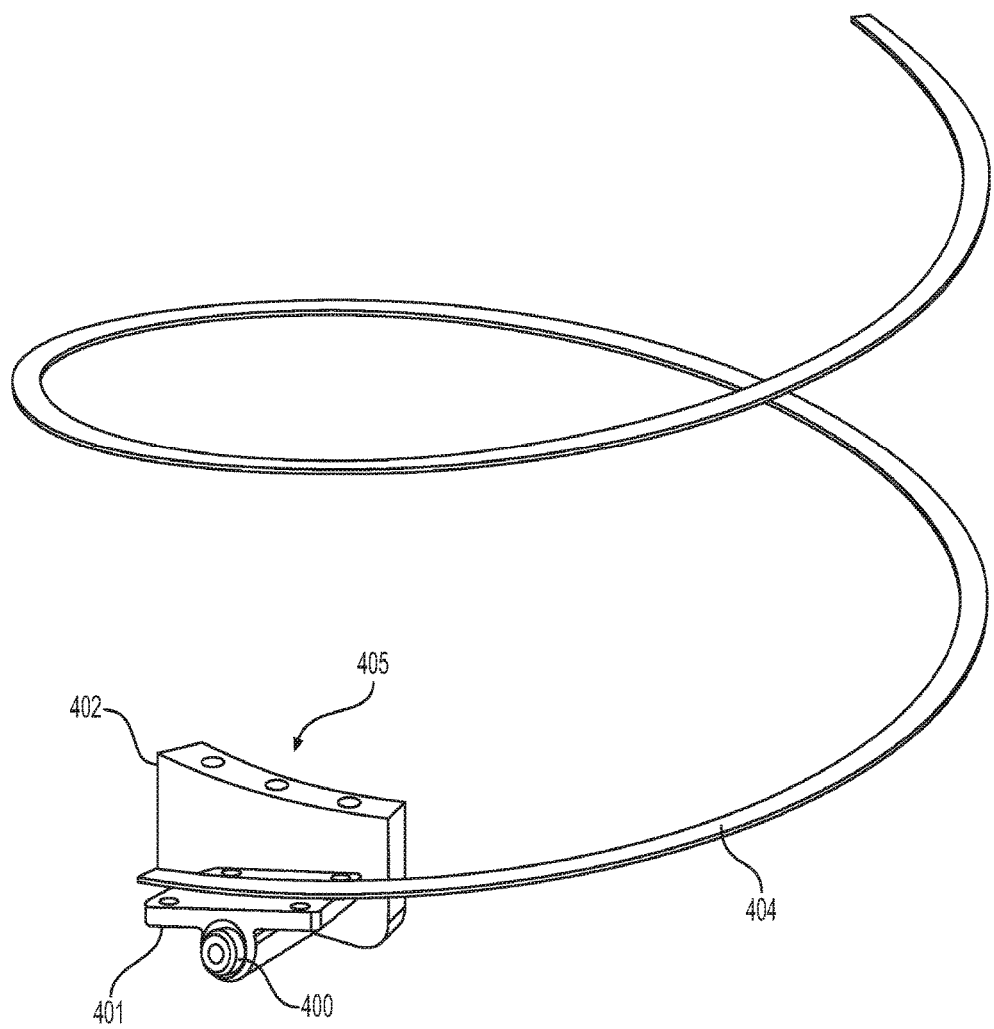
FIG. 4 illustrates an embodiment of a cable management spiral in cooperative engagement with a pivoting attachment bracket.

Contemporary mast systems use fixed brackets to connect the cable management assembly to the mast system. With a fixed bracket, the forces generated by the cable management assembly during extension and retraction are focused at the connection point. As a result, mechanical failures (e.g., stress failures, brittleness failures, etc.) may be experienced at or near the bracket connection point(s). Embodiments of the cable management spiral may be attached to a pivoting bracket system to alleviate these failures through transferring certain amounts of forces about the pivot. FIG. 4 illustrates an embodiment of a cable management spiral 404 in cooperative engagement with a pivoting attachment bracket 405. In this embodiment, pivoting attachment bracket 405 includes a spiral pivot bracket 401 connected to pivot bracket mount 402 through shoulder bolt 4000. It should be appreciated that other connection mechanisms as are known in the art, may be used to connect spiral pivot bracket 401 to pivot bracket mount 402. Spiral pivot bracket 401 may pivot relative to pivot bracket mount 402 about the shoulder bolt 400 long axis. Spiral pivot bracket 401 may be connected to a segment of cable management spiral 404, such as, for example, a segment in close proximity to an end of the cable management spiral 404, such as the top end or the bottom end. In the configuration shown in FIG. 4, pivoting attachment bracket 405 may be connected to a section of the mast, such as the lowest section. Cable management spiral 404 may connect to the spiral pivot bracket 401 through attachment clamps (not shown for clarity), for example, although one of skill in the art may use other attachment mechanisms known in the art to secure a segment of cable management spiral 404 to spiral pivot bracket 401.

Embodiments of the pivot bracket eliminate localized bending forces acting on the cable management assembly caused by, among other sources, the change in geometry that occurs during mast extension and retraction. The bending forces lead to early fatigue failure in fixed bracket systems, particularly at lower temperatures such as, for example, during winter months. A pivot bracket as described herein provides for a significantly longer service life of the cable management assembly. Although FIG. 4 shows a single pivoting bracket system, one or more pivot brackets may be employed at other locations, such as, for example, the upper and lower tube sections of a mast assembly. In addition to mounting to the mast, a hard point may be mounted to a portion of the mast. An end segment of the cable management spiral may be connected to the hard point through, for example, a pivoting bracket as described herein.

Embodiments of cable management assemblies including a cable management spiral as described herein may be manufactured with ease, as compared to the contemporary air hose systems, and without complicated tooling or equipment. Additionally, repair and/or replacement of an individual cable (e.g., a defective cable in a cable management assembly) may be accomplished without special skills or equipment in the field, if necessary.

Figure 5:
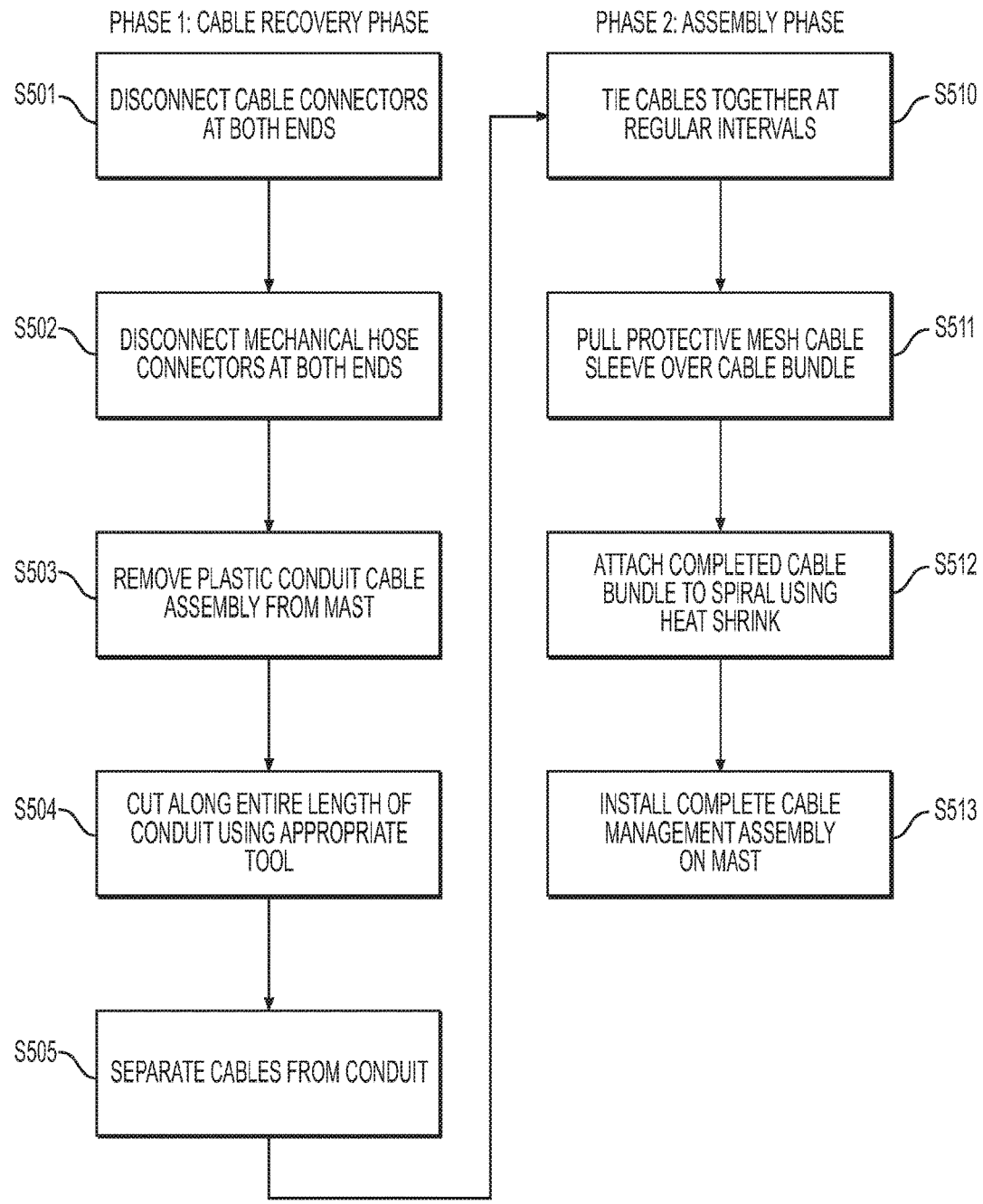
FIG. 5 shows a flow chart illustrating a method for replacing a contemporary air hose coil in a cable management assembly with a cable management spiral.

FIG. 5 shows a flow chart illustrating an exemplar method for replacing a contemporary air hose coil in a cable management assembly with a cable management spiral. The left hand side of the flow chart (steps S501 through S505) shows the steps for recovering the internal cables and/or a cable bundle from an air hose conduit in an existing cable management assembly. The right hand side of the flow chart (steps S510 through S513) shows steps for integrating existing or new cables (or cable bundles) with the a cable management spiral, that may be installed on a mast system. It should be appreciated that these steps are demonstrative, and one of skill in the art may modify one or more steps, such as through combining steps, without departing from the scope of the present approach.

In "Phase 1: Cable Recovery Phase," at step S501, the ends of cable connectors may be disconnected. Next, at step S502, the mechanical hose connectors may be disconnected at both ends. Then the plastic conduit cable may be removed from the mast at S503. At step S504, the conduit (e.g., air hose) may be cut along its entire length, and then at step S505 the cable bundle(s) may be separated from the conduit.

In "Phase 2: Assembly Phase," at step S510, any loose cables (if any) may be tied together at regular intervals (or other intervals as may be desired), to form a cable bundle. Next, at step S511, a protective mesh sleeve may be pulled over the cable bundle(s). At step S512, the cable bundle(s) may then be attached to a cable management spiral using a heat shrink wrap as described above, to form a cable management assembly. Heat shrink may be applied as is known in the art, using a heat source (e.g., heat gun, hair dryer). Finally, at step S513, the cable management assembly may be installed on a mast. It should be appreciated that the demonstrative method described in FIG. 5 results in a cable management assembly embodiment similar to the embodiment shown in FIG. 3(B). Other relative configurations of the components in a cable management assembly may be desired, such as shown in FIG. 3(A). It should be apparent to one of skill in the art that the method of FIG. 5 may be revised to attach the components, and possibly other components, in a different order (e.g., cable bundle attached to cable management spiral, then heat shrink wrapped at desired locations, then application of an exterior sheath) to result in the desired configuration, without departing from the teachings herein.

Embodiments of the cable management spiral have performed exceptionally in testing, particularly when compared to contemporary systems using industrial air hose for cable management. As mentioned above, such contemporary systems perform poorly at low temperatures because the mechanical properties of air hoses vary significantly with temperature. Nylon and polyurethane air tubes, including Nycoil® air tubes, show significant increases in spring force as temperature decreases, which results in a significant increase in the mast payload's effective weight. Additionally, such contemporary systems fail to nest properly (e.g., return to a coiled position during retraction of the mast), particularly in cold weather environments. This drawback is experienced with contemporary air tube systems, particularly Nycoil® systems, after the air tube is exposed to low temperatures (e.g., below 30 degrees Fahrenheit) while the mast is extended in cold weather for short time (e.g., as little as two hours). Embodiments of the cable management spiral, on the other hand, overcome the both the cold weather spring force and nesting challenges. Whereas contemporary air hose systems require manual manipulation for proper nesting in cold weather, embodiments of the cable management spiral do not require an operator to manually assist the nesting process during mast retraction. Even after the mast was extended in cold weather (e.g., −35 degrees Fahrenheit) for 15 hours, embodiments of the cable management spiral continued to nest on retraction, without requiring manual assistance. Operators familiar with the difficulties of manually nesting contemporary systems will appreciate the benefits associated with the cable management system described herein.

Importantly, the methods described herein have no need to remove cable connectors at any stage, in contrast with contemporary air hose conduit replacement. Therefore, there is no requirement for specialist knowledge or equipment to install and test cable performance following installation of new connectors, as would otherwise be the case. Both Phase 1 and Phase 2 may be accomplished very quickly, even in the field, if necessary, since there is no need for special tools or skills at any stage of the procedure.

It should be appreciated that the cable management spiral as described herein is not restricted solely to use in connection with telescopic masts. There are other types of mast which would benefit from incorporation of a cable management spiral, and there are also many devices which extend and retract, or change geometry in some way, where flexible interconnection of power and/or signal cables is required.

The terminology used herein is for the purpose of describing particular embodiments only and is not intended to be limiting of the approach. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The invention may be embodied in other specific forms without departing from the spirit or essential characteristics thereof. The present embodiments are therefore to be considered in all respects as illustrative and not restrictive, the scope of the invention being indicated by the claims of the application rather than by the foregoing description, and all changes which come within the meaning and range of equivalency of the claims are therefore intended to be embraced therein.

The invention claimed is:

1. A cable management assembly comprising:
 a cable management spiral comprising a metallic spring coil configured to wrap around a telescoping mast and exert a spring force on a mast payload; and
 a cable bundle in operative engagement to the cable management spiral.

2. The cable management assembly of claim 1, wherein the cable management spiral comprises a stainless steel spring coil.

3. The cable management assembly of claim 1, wherein the cable bundle is operatively engaged to the cable management spiral by a heat shrink wrap.

4. The cable management assembly of claim 3, further comprising a plurality of heat shrink wrap lengths along a plurality of lengths of the cable management spiral.

5. The cable management assembly of claim 1, further comprising a sheath surrounding the cable bundle.

6. The cable management assembly of claim 5, wherein the sheath surrounds the cable management spiral.

7. The cable management assembly of claim 5, wherein the sheath and cable bundle are operatively engaged to the cable management spiral by a heat shrink wrap.

8. The cable management assembly of claim 7, wherein the heat shrink wrap surrounds the sheath, cable bundle, and cable management spiral.

9. The cable management assembly of claim 1, wherein the cable management spiral comprises a stainless steel spring coil having a generally rectangular cross section.

10. The cable management assembly of claim 1, further comprising a pivoting bracket pivotally connected to the cable management spiral.

11. A telescoping mast system having a cable management assembly, the cable management assembly comprising:
 a cable management spiral comprising a metallic spring coil wrapped around the telescoping mast and exerting a spring force on a mast payload; and
 a cable bundle in operative engagement to the cable management spiral.

12. The telescoping mast system of claim 11, wherein the cable management spiral comprises a first end and a second end, and the first end is operatively engaged with a lower portion of a mast, and the second end is operatively engaged with at least one of an upper portion of the mast and a hard point mounted to a portion of the mast.

13. The telescoping mast system of claim 12, further comprising a pivoting bracket connected to a mast segment and a cable management spiral segment, the pivoting bracket pivotally engaging the mast segment to the cable management spiral segment.

14. A method for forming a cable management assembly, the method comprising:
 forming a cable bundle;
 operatively engaging the cable bundle to a cable management spiral comprising a metallic spring coil configured to exert a spring force on a mast payload.

15. The method of claim 14, wherein operatively engaging the cable bundle to a cable management spiral comprises attaching at least a portion of the cable bundle to at least a portion of the cable management spiral with a heat shrink wrap.

16. The method of claim 14 further comprising enclosing the cable management bundle in a sheath.

17. The method of claim 14 further comprising cutting an air hose conduit along a long axis of the conduit; and removing the cable bundle from an air hose conduit.

18. The method of claim 14, further comprising connecting the cable management spiral to a pivoting bracket.

* * * * *